United States Patent [19]

Nagao

[11] 4,378,951
[45] Apr. 5, 1983

[54] TRAVELING WAVE COUPLED TYPE OPTICAL WAVE CIRCULATORS

[76] Inventor: Tsukasa Nagao, 4-75, Mabori, Yokosuka-shi, Kanagawa-ken, Japan

[21] Appl. No.: 161,075

[22] Filed: Jun. 19, 1980

[30] Foreign Application Priority Data

Jun. 27, 1979 [JP] Japan .................. 54-81180

[51] Int. Cl.³ ............................................. G02B 5/172
[52] U.S. Cl. .................. 350/96.15; 350/375
[58] Field of Search ............. 350/96.1, 96.15, 96.16, 350/96.29, 96.30, 355, DIG. 3, 375, 376; 333/1.1, 21 R, 21 A, 24.1, 24.3

[56] References Cited

U.S. PATENT DOCUMENTS

| | | | |
|---|---|---|---|
| 3,368,861 | 2/1968 | Rubinstein et al. | 350/355 X |
| 3,633,992 | 1/1972 | Uchida et al. | 350/96.29 X |
| 4,274,710 | 6/1981 | Nagao | 350/375 |
| 4,294,509 | 10/1981 | Nagao | 350/96.15 |

Primary Examiner—John D. Lee
Attorney, Agent, or Firm—Spensley, Horn, Jubas & Lubitz

[57] ABSTRACT

An optical wave circulator of the invention utilizes the coupled hybrid mode of split magneto-optical circular-cylindrical-transmission-line (MOTL) waves, with the biasing magnetic field applied parallel to the common axis. Coupling between waves of optical glass fiber transmission lines (GFTLs) and those of the MOTL can be made through openings of the MOTL junction. Forward-to-forward traveling wave coupling, forward-to-backward traveling wave coupling and others perform important roles in achieving circulations. Use of more than a single operating point for circulator performance can be made to obtain broadband and diplexer operations in the optical waves.

16 Claims, 29 Drawing Figures

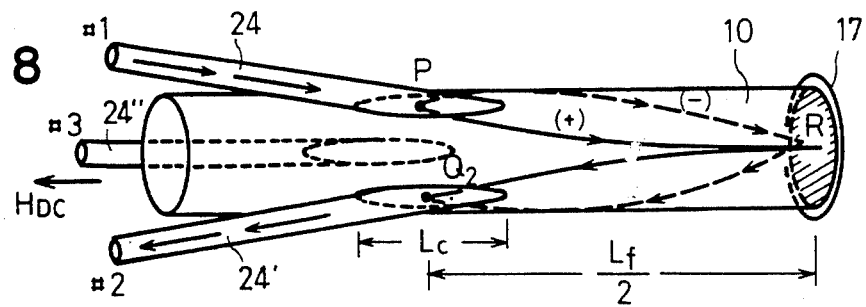
FIG. 8
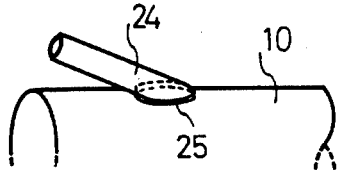
FIG. 9(a)
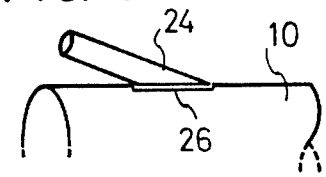
FIG. 9(b)
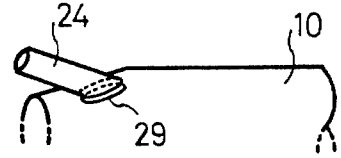
FIG. 9(e)
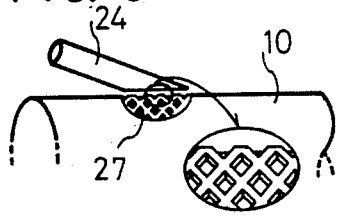
FIG. 9(c)
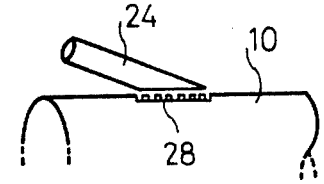
FIG. 9(d)
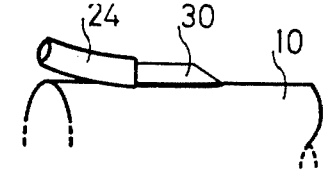
FIG. 9(f)
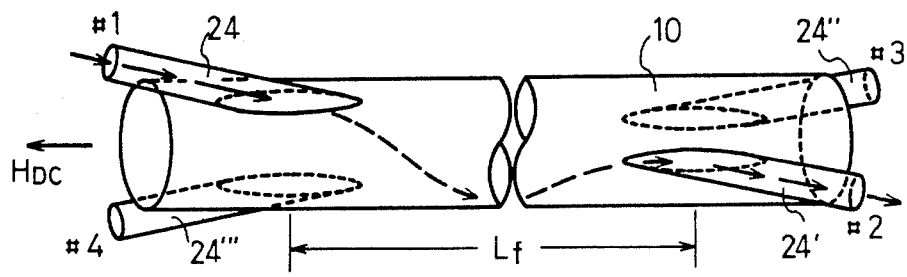
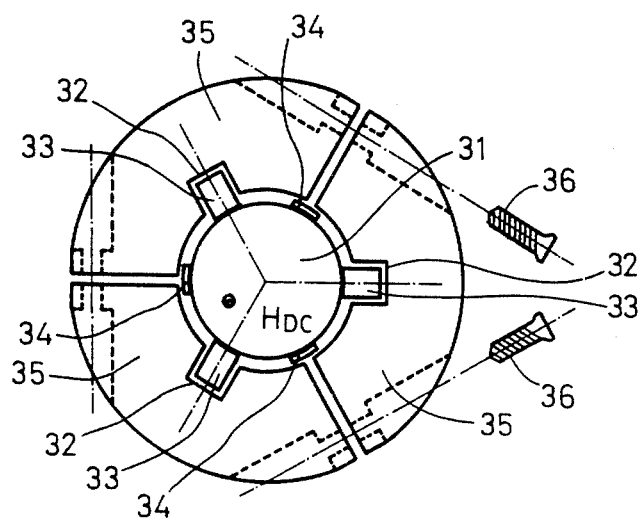
FIG. 10
FIG. 11

TRAVELING WAVE COUPLED TYPE OPTICAL WAVE CIRCULATORS

BACKGROUND OF THE INVENTION

This invention relates to an optical wave circulator compatible with an optical glass fiber transmission line (GFTL) and useful in optical communications.

Recently, optical communication, using GFTLs that have low losses for the laser wavelengths of 1.0 microns to 1.5 microns promises large communication capacity and long distance communication. Optical wave circulators have an indispensable role in two-way communication, reduction of reflection, research and development of optical amplifiers, modulators, demodulators, and in miscellaneous networks for optical communication use. However, up to the present there has been no optical circulator with good performance characteristics available for use in optical communications. This is also the case with circulators in the millimeter and sub-millimeter wavelength ranges. One reason is that the design principle of microwave Y-junction circulators of good performance is not applicable to optical wave and millimeter wave circulators.

In fact, with millimeter waves, a Faraday-rotation-type circulator that was invented by C. L. Hogan in 1952 has long been used. The circulator of this type is made by inserting a circulator ferromagnetic cylinder acting as a gyrator into a hollow circular waveguide, with two pairs of two independently linearly polarized waveguide couplers connected separately to it. The biasing magnetic field is applied parallel to the common axis of the cylinder. Signal waves, being linearly polarized on passing through a rectangular waveguide, are rotated by the gyrator by 45°, and the Faraday rotated waves emanate from the output port assigned to such a 45° polarized wave. The Faraday-rotation-type circulator is a four-port circulator due to the rotation of 45°, and is classed as a transmission-type circulator.

Application of the Faraday-rotation-type circulator to an optical circulator has been tried by many researchers in the U.S.A. and in Japan. One recently reported optical circulator of this type comprised an optical gyrator made of magneto-optical (MO) material and a pair of Glan-Taylor prisms which were placed separately from the gyrator, with the biasing magnetic field applied in the direction of wave propagation. This acted as a transmission-type four-port circulator. The common feature of the Faraday-rotation-type circulator is dependency on polarization of the signal waves of interest. Such dependency is rather convenient in microwaves and millimeter waves when a rectangular waveguide is used. In optical communications, however, the GFTL is used as a guiding medium for wave propagation of hybrid modes—EH and HE modes, which are considered to include two rectilinearly polarized optical waves. Incident optical wave power from such a GFTL on such a Faraday-rotation-type circulator is inevitably dissipated by one-half since such a circulator utilizes a linearly polarizing element which can only utilize one of the two rectilinearly polarized waves.

Very recently, an alternative to such half power dissipation has been reported to Japan. The linearly polarizing elements are still used and other elements are another cause of loss. The circulator still has large dimensions in comparison with those of the GFTL. Furthermore, the operating frequency band of the circulator is bound by the pass length of the wave propagation condition required by the Faraday rotating angle of 45°.

The object of the invention is to eliminate such defect in the Faraday-rotation-type circulator and to provide polarization-free, high performance circulators in the optical and millimeter waves.

A common basic idea underlying the invention originates from the fact that the propagating waves in the GFTL can normally couple with the cylindrical waves of hybrid modes propagating in an MO circular cylindrical transmission line (MOTL) under a biasing magnetic field, since both waves propagating in the GFTL and MOTL are of hybrid modes.

A GFTL has two different types of transverse refractive index profiles, one is a stepwise index profile (SI type) and the other is a graded index profile (GI type). Only a GFTL of the SI type is used in this disclosure of the invention.

An elementary circulator embodiment of the invention comprise an MOTL, a waveguiding system of GFTLs arranged in rotational symmetry and positioned to suit certain transverse and longitudinal requirements, and a magnetic biasing means. The MOTL coupled with the GFTLs is simply termed the MOTL junction. In the MOTL junction, traveling waves of hybrid modes in the GFTLs may couple with ones of the MOTL to induce coupled MOTL wave modes as circulating modes. Various operating points are found to perform multiple frequency operation, as with a microwave circulator.

The MOTL waves of hybrid modes are determined by the electric wall conditions specifying the peripheral surface of the MOTL of the present invention. These conditions are realized by covering the MOTL with a conducting wall or a reflecting film. The MOTL junction has as many openings as coupled GFTLs, each GFTL being coupled through its aperture and the corresponding opening. There are various aspects for coupling, that is, light and tight couplings with uniform and nonuniform coupling structures which are formed on the openings of the junction. Another concern is about the types of traveling waves which are coupled. If incident optical waves traveling down the GFTL can be converted to MOTL waves traveling down the MOTL junction, then forward-to-forward TW coupling (F-F coupling or codirectional coupling) takes place. Subsequently, if the MOTL traveling waves can be reconverted to a GFTL wave traveling along the GFTL and both waves are forward traveling waves, then, F-F coupling takes place. In addition, there is forward-to-backward TW coupling (F-B coupling or contradirectional coupling) or the inverse B-F coupling. Accordingly, various types of traveling-wave-coupled circulators are embodied. Two types, transmission and reflection types, will be disclosed.

The MO material is defined as such that the Faraday rotation effect acts on waves passing in the direction parallel to the biasing magnetic field, the Cotton-Mouton effect acts on waves passing normal to the direction of the biasing magnetic field, and the MO Kerr effect acts on waves being reflected from the surface of the MO material, all of which appear under the biasing magnetic field. Above all, the Faraday effect plays a major role in all circulator embodiments of the invention. The most useful MO material is crystaline rare earth iron garnet that may have a large Faraday rotation and small absorption losses, ie., have large figure of merits (the ratio of the Faraday rotating angle (degree)

and absorption losses (dB) for unit length). The Faraday effect can be described in terms of tensor permittivity and particularly the MO anisotropic splitting factor under the biasing magnetic field, in contrast to ferromagnetic material in millimeter waves that can be described in terms of tensor permeability and its anisotropic splitting factor under the biasing magnetic field.

The MO structure used has a geometric configuration of a circular cylinder so as to use the MOTL waves. The MOTL waves are characterized by the hybrid modes of EH and HE waves, which appear alternately with increase of eigenvalues (i.e. radial wave propagation constant radius product) and also longitudinal wave propagation constant. The MOTL waves are split under the biasing magnetic field to have different radial and longitudinal wave propagation constants with respect to clockwise and counterclockwise rotating waves of every azimuthal mode number. On the other hand, the GFTL waves are of course EH and HE waves of hybrid modes different from the MOTL waves, and they have degeneracy in the azimuthal rotations. In addition, the MOTL has several times as large a diameter as that of the GFTL, being large enough to produce multiple radial resonance. Particularly, each of the radial resonances in the MOTL wave modes is characterized by two different radial wave numbers representing the respective radial wave field distributions; first, if the two wave numbers are real, the respective wave fields distribute in the whole transverse section of the MOTL, so they are called the volume-volume mode; next, if either of the two wave numbers is imaginary, a corresponding wave field distributes specifically in the surface region rather than its whole section, centripetally tailing off, so they are called the volume-surface or surface-volume mode; lastly, a surface-surface mode is termed for the waves having two imaginary wave numbers, so the wave field power dominates only in the surface region. The propagating waves of hybrid modes have multiple radial eigen resonance with respect to every azimuthal number. Particularly clockwise and counterclockwise rotating waves of each azimuthal number are split from degeneracy due to the MO anisotropic splitting factor. This factor is given by $\eta/\epsilon$ the ratio of the diagonal and off-diagonal elements to tensor permittivity of the MO material under the biasing magnetic field. The ratio of $\eta/\epsilon$ is actually far below the value of the ferromagnetic anisotropic splitting factor $k/\mu$ in millimeter waves, so that a longer distance to transit is required for the waves of interest to effect sufficient Faraday rotation as far as the MOTL is concerned.

In short, the traveling waves of the hybrid modes in the MOTL are split into the right and left rotating waves while propagating down the MOTL with different propagating velocities. Consequently, to get an optical circulator, the MOTL junction must satisfy circulator requirements which depend on radial, azimuthal and longitudinal wave propagations. As they will be more specifically disclosed in connection with drawings, circulator performance closely depends on the choice of operating points which can be determined by intersections of the circulating mode curves and a biasing internal magnetic field locus. The circulating mode is defined using the MOTL hybrid modes. Application of multiple operating points to circulator operation results in multiple frequency operation. Broadband and diplexer operation can be performed.

SUMMARY OF THE INVENTION

Circulator embodiments of the invention include transmission and reflection types, each of which utilizes coupled hybrid modes of the split MOTL waves, with the biasing magnetic field applied parallel to the common axis. Coupling between waves of GFTLs and MOTL can be made through openings of the MOTL junction. Forward-to-forward traveling wave coupling, foward-to-backward traveling wave coupling, and others act in important roles in achieving circulations. Use of more than a single operating point to circulator performance can be made to obtain broadband and diplexer operations in the optical waves. Application of the optical wave circulator embodiments of the invention to millimeter waves is recognized.

BRIEF DESCRIPTION OF THE DRAWINGS

FIG. 2(a) shows a graph of $x_1$, one of the radial eigenvalues, as a function of the anisotropic splitting factor $\eta/\epsilon$ ($k/\mu$ for the ferromagnetic circular transmission line) with respect to the lowest order of the azimuthal numbers $n = +1$ and $-1$. FIG. 2(b) shows the related propagation constant ratio $\bar{\beta}$ versus $\eta/\epsilon$ ($k/\mu$) diagram and FIG. 2(c) shows another $\bar{\beta}$ versus $\eta/\epsilon$ ($k/\mu$) diagram. $H_i$ indicates a locus of the biasing internal magnetic field.

FIG. 3 illustrates the performance mechanism of the circulator for the uniformly-coupled transmission type.

FIG. 6 illustrates sectional views of various MOTL junctions useful to the circulator embodiment of the invention.

FIG. 7 illustrates the performance mechanism of a circulator embodiment of the invention for the nonuniformly-coupled-transmission type.

FIG. 8 is a view in perspective of a nonuniformly-coupled-reflection-type three-port circulator embodiment of the invention.

FIG. 9 illustrates various coupling structures for openings of the MOTL junction which are useful to a circulator embodiment of the invention. FIG. 9(a) shows an instance of coupling between a GFTL or microlens 24 cut slopewise and the opening 25 made on the junction, FIG. 9(b) shows another instance of coupling between a GFTL or microlens 24 cut slopewise and the flat opening 26, FIG. 9(c) shows another instance of coupling between a GFTL or microlens 24 cut slopewise and the double corrugated opening 27, FIG. 9(d) shows another instance of coupling between a GFTL or microlens 24 cut slopewise and the doubly corrugated flat opening 28, FIG. 9(e) shows another instance of coupling of a GFTL or microlens 24 cut slopewise and the opening 29 made on the tapered end of the MOTL junction, and FIG. 9(c) shows another instance of coupling of a GFTL with the dielectric radiating element 30 and the opening of the junction.

FIG. 10 is a view in perspective of a nonuniformly-coupled-transmission-type four-port circulator embodiment of the invention.

FIG. 11 shows a cross section of a circulator embodiment of the invention, looking in the common axis, which is applied to millimeter wave use.

DETAILED DESCRIPTION OF THE INVENTION

Figure 1A:
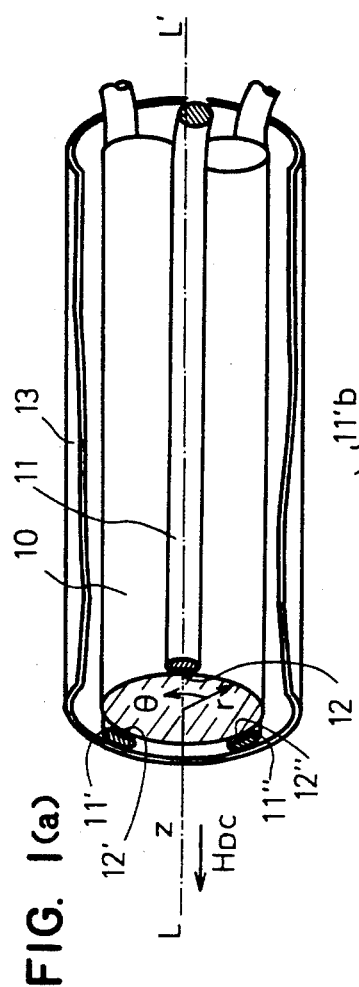
FIG. 1(a) illustrates a perspective view of a uniformly-coupled-transmission type application of a traveling-wave-coupled-type circulator embodiment of the invention in the optical wave region.
Figure 1B:
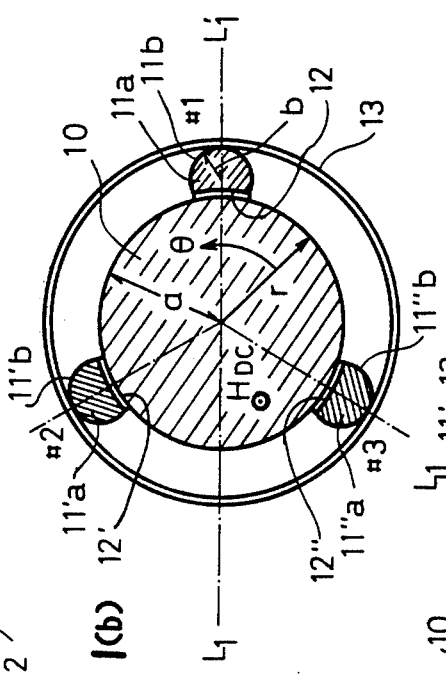
FIGS. 1(b) and 1(c) show its transverse and longitudinal views, respectively.
Figure 1C:
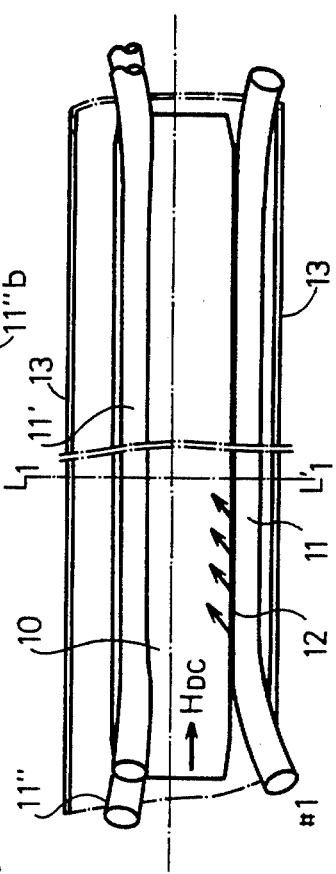
Figure 3A:
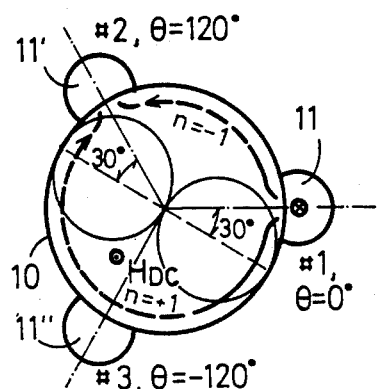
FIG. 3(a) and FIG. 3(c) show the azimuthal electric field pattern of the mode pairs, $n = +1$ and $-1$, and $n = -1$ and $+2$, respectively, and correspondingly.
Figure 3B:
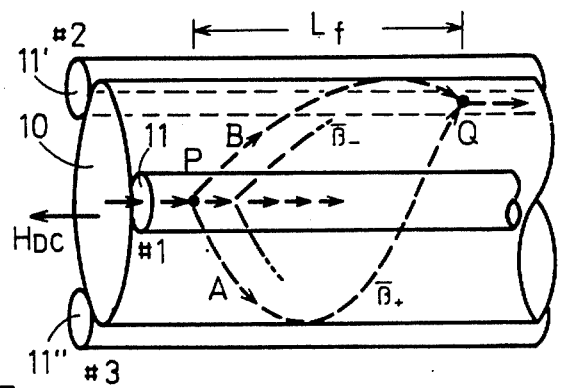
FIG. 3(b) and FIG. 3(d) show the respective optical ray trajectories of positive and negative waves for the F-F couplings of the two mode pairs.
Figure 3C:
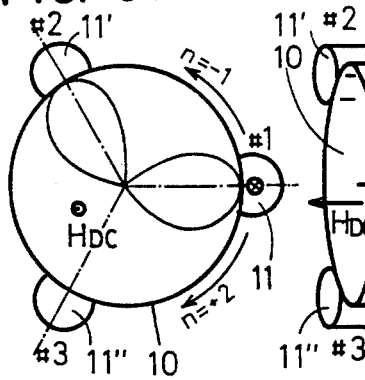
Figure 3D:
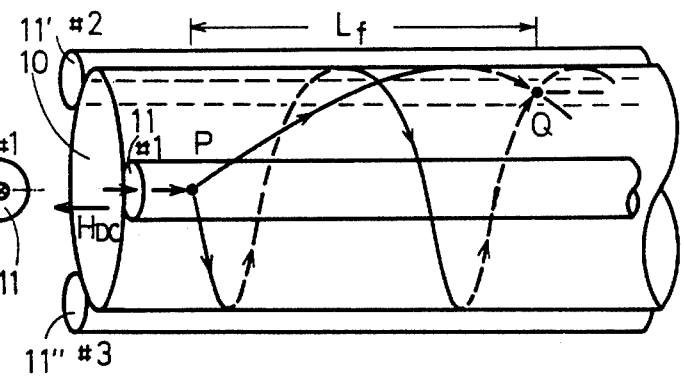
Figure 3E:
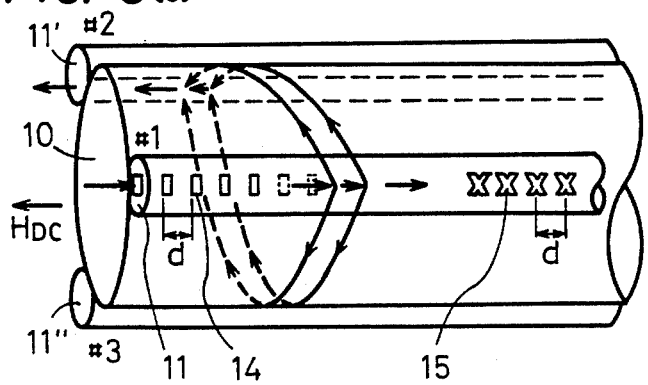
FIG. 3(e) shows optical ray trajectories for the F-B coupling of the mode pair $n = +1$ and $-1$, where two examples of coupling structures are shown. $L_f$ is the least path length for the wave propagation.

Referring to the drawings shown in FIG. 1, a basic structure of a uniformly-coupled-transmission-type circulator embodiment of the invention is first explained. The circulator is set up from a MOTL junction 10 and three GFTLs 11, 11', and 11" closely attached side by side to the MOTL at 120° angles from each other, each GFTL being laterally cut flat and as deeply as required to reach to the core region, in order to couple the GFTLs with the MOTL through the slit openings 12, 12', and 12". The diameter a of the MOTL is far longer than the wavelength of the optical wave. The biasing magnetic field $H_{DC}$ is applied parallel to the common axis L-L'. All the components are set up in the casing 13. Guided optical waves in a GFTL can continuously leak out through one of the openings 12, 12' and 12" to excite the MOTL waves of various orders of the hybrid modes, each wave of which is divided into right and left rotating waves traveling down the guide, thereby tracing the respective right and left circulating helical trajectories.

Figure 2A:
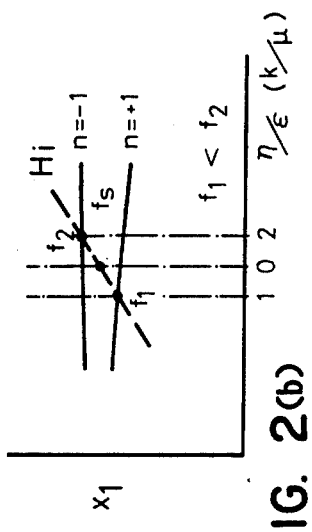
FIGS. 2a-2c are graphs of propagation characteristics of the MOTL waves (solid lines) and coupled MOTL waves (broken lines).
Figure 2B:
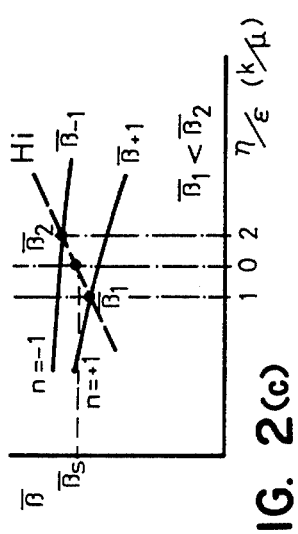
Figure 2C:
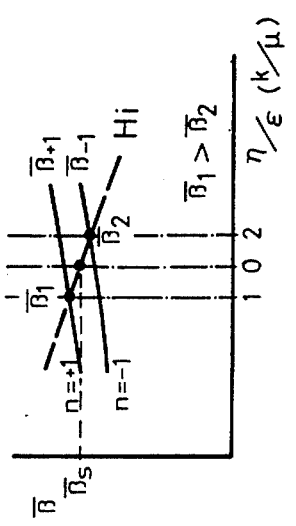

The wave propagation characteristics of the MOTL waves are shown schematically in FIG. 2, with respect to the lowest order pair modes of $n = +1$ and $-1$. The MOTL waves of the hybrid modes are generally defined by radial eigenvalues (radial wave propagation constant radius product), longitudinal wave propagation constant ratio and azimuthal numbers. The former two closely depend on the MO anisotropic splitting factor $\eta/\epsilon$ in the optical waves ($k/\mu$ in the millimeter waves). The radial eigenvalue has m times as many values as an m times a wavelength radius of the MOTL. Every radial eigenvalue gives two values $x_1$ and $x_2$, each of the two having different values for the positive and negative azimuthal mode numbers, and therefore, m pairs for $x_1$ and $x_2$ with respect to every azimuthal mode number are obtained for the m times a wavelength traidus of the MOTL. For sake of brevity, only the lowest pair of $x_1$ for $n = +1$ and $-1$ is shown in FIG. 2-a, which indicates that oppositely rotating waves have different radial wave propagation constants. FIGS. 2-b and c show cases of split longitudinal wave propagation constant ratios $\bar{\beta}$ (the ratio of the longitudinal wave propagation constant with the biasing magnetic field and the propagation constant for the plane wave free of the biasing magnetic field), one is that the phase velocity of $n = +1$ is faster than that of $n = -1$, and the other is vice versa. Use of these different propagation characteristics to effect circulator performance may result in phase compensation of optical pulse transmission through the device.

To explain the performance mechanism of the MOTL junction, it is assumed that incident optical waves of the frequency $f_s$ which is given on the broken line, from the GFTL 11 for the #1 port excite inside the MOTL two opposite rotating waves of $n = +1$ and $-1$ which take the respective resonant frequencies $f_1$ and $f_2$ with the relation $f_1 < f_s < f_2$. The broken lines in FIGS. 2-a to c indicate circulating mode curves specifically defined by the mode pair of $n = +1$ and $-1$. It is found that intersections of two curves of $x_1$ and $x_{1c}$, and $H_i$ correspond to the respective intersections of $\bar{\beta}$ and $H_i$ with the same values of $\eta/\epsilon$ ($k/\mu$) as are marked by numbers, 1, 0, and 2. The waves of $n = +1$ and $-1$ have the ratios $\bar{\beta}_{+1} = \bar{\beta}_{-1}$ and $\bar{\beta}_{-1} = \bar{\beta}_2$ at frequencies $f_1$ and $f_2$, respectively, and the wave of $n = +1$ has faster phase velocity than the wave of $n = -1$ because of $\bar{\beta}_1 < \bar{\beta}_2$. The wave of $n = +1$ of $f_s$ has a leading phase angle since $f_1 < f_s$ and its input impedance may have a capacitive reactance component, whereas the wave of $n = -1$ of $f_s$ has a lagging phase angle since $f_s < f_2$, and its input impedance may have an inductive reactance component. If the signal frequency $f_s$ is chosen to have these input impedances matched, and if the resultant dipolar electric fields pattern which these waves produce in the circumferential surface of the MOTL is rotated by 30° at the input port #1 in the transverse section as shown in FIG. 3-a, the resultant field at the #2 port has the same amplitude response that is produced at the #1 port, but the resultant field at the #3 port becomes null.

FIG. 3-b illustrates optical ray trajectories in the longitudinal direction along which the two waves propagate when the aforementioned transversely induced dipolar pattern is produced. The incident waves at P on the junction are divided into two waves, A and B. A indicates the one wave propagating down the MOTL with the negative sense of rotation, and B the other wave propagating in the positive rotating sense. After passage through the distance $L_f$ in the forward direction, under the condition of $\bar{\beta}_+ = \bar{\beta}_- = \beta_{1c}$, they meet at Q on the opening 12' where a slit for the opening is formed for the two waves to emanate into the GFTL 11'. Thus, the incident waves, being guided along the GFTL 11, continuously excite the two opposite rotating waves inside the MOTL through the opening 12, and after passage through the distance $L_f$, they meet on the opening 12' to radiate out in the GFTL 11' but no wave appears on the opening 12". Likewise, the incident waves on ports #2 and #3, respectively, emanate from ports #3 and #1, in the same rotational turn. The performance of the uniformly-coupled circulation is thus described in terms of the modes $n=+1$ and $-1$, or their coupled mode of perfect circulation.

It is to be added that when GFTL waves and MOTL waves are mutually interchanged through the junction, the wave field properties of hybrid modes are retained to dispense with any polarizing element mostly indispensable for a prior-art optical circulator.

There is a combination of opposite rotating modes of $n=-1$ and $+2$, for another example, among various azimuthal mode combinations. When these mode pairs produce a skewed dipolar pattern as shown in FIG. 3-c, they then longitudinally meet with each other at Q on the junction as shown in FIG. 3-d. Thus an alternative circulation can be obtained. Other combinations of various order modes for opposite rotating waves can be useful in getting circulation.

The above-described circulator performance can be attributed to F-F coupling, and therefore classed as a transmission-type six-port circulator. Apart from the F-F coupling, there is F-B or B-F coupling between the GFTL and MOTL waves. The F-B coupling makes the six-port circulator degenerate into a transmission-type three-port circulator. To realize the F-B coupling, the MOTL junction requires a coupling structure which converts the forward traveling GFTL waves to the backward traveling MOTL waves, and reconverts the backward traveling MOTL waves to the backward traveling GFTL waves. Periodically and logarithmic periodically arranged series-slot array or parallel-slot array for the opening, periodically or log-periodically corrugated structure formed on the surface of the opening, crossed slot array, combination of slit and slots, and others are considered to be valuable to effect the F-B coupling or B-F coupling. Only F-B coupling is adduced in the disclosure of the invention, although the B-F coupling can be used.

An instance of a series-slot array is now considered. An opening with the series-slot array 14 is partially shown in FIG. 3-e. Additionally, the crossed-slot array 15 is shown. The spacing d is chosen to be longer than half the propagating wavelength of the GFTL waves. Incident GFTL waves are to irradiate each slot of the array on the opening of the junction to excite the MOTL waves traveling backwards. In fact, radiated waves from the slot array inside the MOTL junction may have a constant phase plane propagating in the backward direction but inclined at different common angles right and left to the common axis. It is noted that the MOTL waves having the negative propagation constants take the radial eigenvalues $x_1$ and $x_2$ mutually interchanged with the values $x_1$ and $x_2$ for the waves having the positive propagation constants. Consequently a change of sign in the propagation constant results in exchange of a volume-surface mode, for instance, with a surface-volume mode, and also, a surface-surface mode with a different surface-surface mode.

Conversion of the incident GFTL waves to the backward MOTL waves is not novel but well known in the microwave traveling wave antenna techniques, which is applicable to radiation of the GFTL waves from the slot array into the MOTL junction. The backward MOTL waves rotating right- and left-wards may meet on either opening at 120° apart from the incident opening, and through the slot-array opening, the optical wave power emanates in the GFTL for the output. The process of the output power emanating through the slot array is codirectional coupling which is different from the contradirectional process of the F-B couping for the incident optical wave. In order to secure the contradirectional and codirectional couplings, choice of GFTL and MOTL waves in relation to the coupling structure is elaborately made. By using such contradirectional coupling, a traveling-wave-uniformly-coupled-transmission-type circulator can be realized.

As disclosed above, the codirectional and contradirectional couplings play the major roles in the uniformly-coupled-transmission-type circulator. The former coupling provides a six-port circulator, and the latter a three-port circulator.

Regarding the above-disclosed circulator embodiments of the invention, various parameters are considered. Biasing magnetic field and signal frequencies of the optical waves are used for adjustment of circulator operation. The diameter of the MOTL, and the coupling factor depending on the mechanism and dimensions of the coupling structure of the opening are important in designing the circulator. The coupling factor of the coupling structure gives the maximum length necessary for completely converting the GFTL wave power to the MOTL wave power or reconverting them in the reverse wise. If the width is narrow in the uniform coupling structure like a slit, the GFTL wave power is uniformly and continuously leaked out into the MOTL junction and then the light coupling takes place. However, if the width is almost the same as that of the diameter of the core of the GFTL, the GFTL waves are more rapidly changed to the MOTL waves so that the GFTL waves can not long propagate. Then tight coupling takes place. In so far as the uniform coupling structure is concerned, the width of the opening must be limited within a narrow range. Otherwise, the coupling tends to have the nature of tight coupling, and the coupling structure acts as a nonuniform coupling structure. Relevant operating modes and operating points are consequently altered depending on the degree of coupling from tight coupling to light coupling. To shorten the length for coupling, deformation of the transverse section of a coupled GFTL and continuous broadening of the coupling width are useful as it will be disclosed later. The total length of the circulator is approximately determined by the length of the coupling.

In the above-described circulator embodiments of the invention, only the lowest-order mode pair $n=+1$ and $-1$, has been described to play the important role, but various combinations among higher order modes than these are still possible to effect circulations. Multiple frequency operation is thereby possible.

To perform the multiple frequency operation, at least two operating points specified with intersections between the radial and longitudinal mode curves of constituent circulating mode and a given common internal magnetic field locus must be utilized, with the circulation requirements as filled in the transverse section and longitudinal direction, both of which have been explained about the operations of mode pairs, $n=+1$ and $-1$, and $-1$ and $+2$, using FIGS. 3-a to 3-d. Extension of the phenomenological explanation to higher order modes can be made with facility. Double frequency operation or triple frequency operation among various multiple frequency operations can be achieved. In particular, if forward and reverse circulations are involved with a common biasing magnetic field, diplexer operation can be realized. The contradirectional coupling that plays an important role in the transmission-type threeport circulator closely depends on the mechanism of the coupling structure formed on the junction. A long slit combined together with a slot array, or a long slit with a corrugate dielectric substrate is useful to make both contradirectional and codirectional couplings function in the transmission-type circulator.

Figure 4:
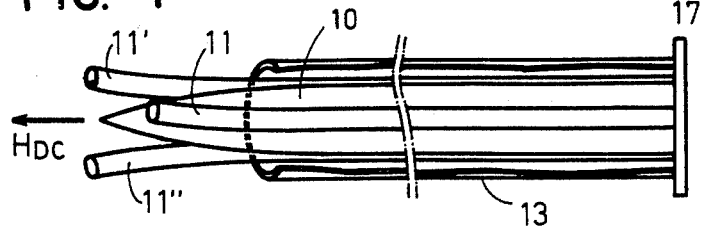
FIG. 4 is a view in perspective of a uniformly-coupled-reflection-type circulator embodiment of the invention having three GFTLs coupled with the MOTL junction with one end terminated with a reflecting mirror and the other end tapered.
Figure 6A:
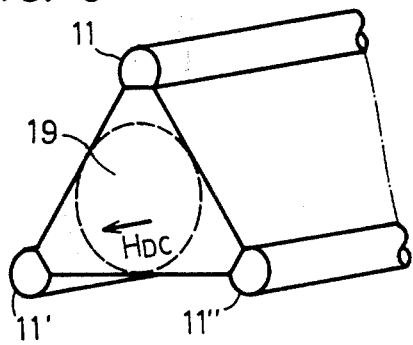
FIG. 6(a) shows a MOTL junction incorporated with a triangular MO cylinder 19 with three apices truncated and three GFTLs coupled thereupon.
Figure 6B:
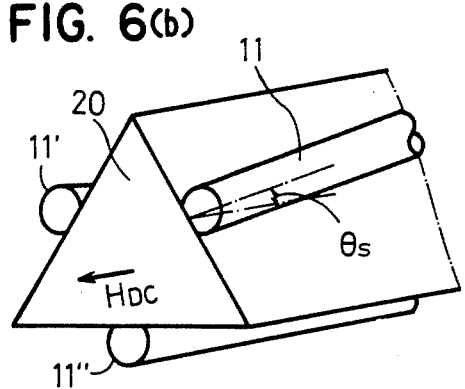
FIG. 6(b) shows another MOTL junction incorporated with a triangular MO cylinder 20 and three GFTLs coupled thereupon, each GFTL being positioned in the middle on each plane of the MO cylinder with an angle $\theta$ between the respective common axes of the GFTL and MOTL.
Figure 6C:
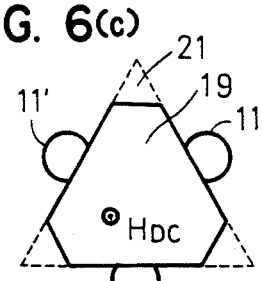
FIG. 6(c) shows another MOTL junction incorporated with a truncated triangular MO cylinder 19 and three GFTLs coupled thereupon.
Figure 6E:
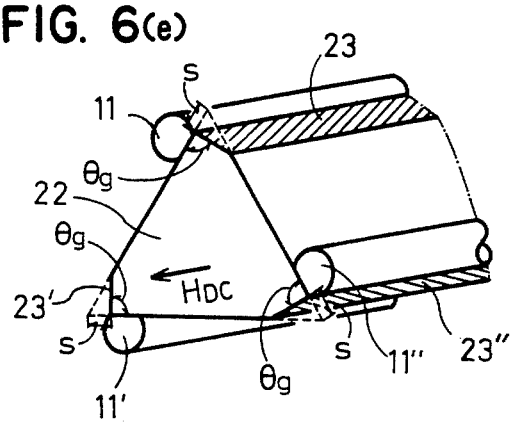
FIG. 6(e) shows another MOTL junction incorporated with a truncated triangular MO cylinder 22 and three GFTLs coupled thereupon, each of three waveguiding planes 23, 23', and 23" being inclined to an angle $\theta_g$.
Figure 6D:
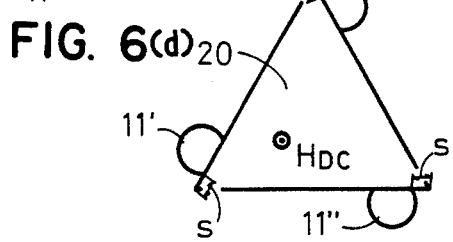
FIG. 6(d) shows another MOTL junction incorporated with a triangular MO cylinder 20 and three GFTLs coupled thereupon, each GFTL being positioned at a distance of s from each apex.

Directly to obtain a three port circulator, a reflection-type circulator embodiment of the invention as shown in FIG. 4 is conceived, which has a reflecting mirror 17 positioned perpendicularly to the common axis at half the coupling distance of $L_c$ that is longer than the distance of $L_f$. With this mirror 17, the MOTL junction 20 has half the length necessary for circulation with the transmission-type circulator embodiment of the invention disclosed in FIG. 1, since the remainder of incident optical wave power in the GFTL and the two MOTL waves rotating oppositely and traveling forwards are reflected back by the mirror and travel up the respective transmission lines, their mutual interactions continuing. In addition, the other end of the MOTL junction is made tapered to squeeze the MOTL wave power out of the junction into the GFTL for the outport, by accelerating the phase velocities of the MOTL waves. Of course, the MOTL junction with the reflecting mirrors at both ends is another alternative to the junction with the mirror and taper.

Figure 5:
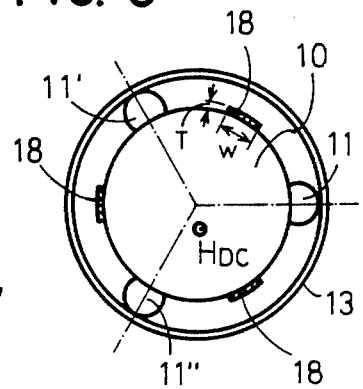
FIG. 5 is an elevation in section of a circulator embodiment of the invention looking in the direction parallel to the common axis. A thin dielectric sheet is attached on the MOTL junction at each counterposition to three coupled GFTLs.

Adjustment of the circulator can usually be made by means of a biasing magnetic field. This way of the adjustment is comparatively ineffective since there is no freedom of choice. To regain broad latitude in the adjustment, the MOTL junction is used with three dielectric sheets 18 positioned parallel contiguously to the MOTL 10 in rotational symmetry in the middle between two coupled GFTLs as shown in FIG. 5. The main role of the dielectric sheets attached is to strengthen the model power densities of the MOTL waves of higher order modes so as to increase contributions of the higher order circulations in the multiple frequency operation. The width W and thickness T of the sheets are parameters of importance in its application to all the circulator embodiments of the invention.

Alternatives to the use of the dielectric sheet in the circulator embodiment of the invention include the application of a triangular cylinder and truncated triangular cylinder to the MOTL junction. FIG. 6-a illustrates the configuration of the MOTL junction that is made by combining the truncated MO triangular cylinder 19 and three coupled GFTLs, 11, 11' and 11'' arranged on the apices of the truncated cylinder. The MO triangular cylinder has the waveguiding role represented by an inscribed circle and the impedance matching role ascribed to the three corner regions connecting three GFTLs to the circular part. FIG. 6-b illustrates another instance of the MOTL junction that is made by combining the MO triangular cylinder 20 and three GFTLs 11, 11' and 11'' connected to the respective planes of the cylinder in the direction inclined at the angle of $\theta_s$ from the common axis. Three apical parts of the junction have the same effect as the dielectric sheets as disclosed in the circulator embodiment of the invention shown in FIG. 5, but comparatively overwhelm the major role of the junction so that the narrow frequency characteristics may be obtained. The angle $\theta_s$ between the center line of the GFTL and the common axis can be used for adjustment of circulation. FIG. 6-c illustrates another instance of the MOTL junction that is made by combining a truncated MO triangular cylinder 19 and three coupled GFTLs 11, 11' and 11'' connected to the respective three planes of the MO cylinder. The truncated portion 21 is effective to reduce the role of the apices in adjustment. FIG. 6-d shows another instance of the MOTL junction which has three coupled GFTLs connected to the MOTL 20 at the distances of s apart from its apices. Change of the distance s is useful to adjust impedance matching between the MOTL and the coupled GFTLs. FIG. 6-e shows another instance of the MOTL junction which is made of an MO cylinder 22 truncated with the reflecting planes 23, 23' and 23'' inclined at the distance s from each apex to the angle $\theta_g$ from a plane on which a GFTL is connected to the MOTL. The truncating planes 23, 23' and 23'' are to act as waveguiding planes for incident and emanating optical waves to improve circulator performance characteristics.

These various instances regarding the three port circulator embodiment of the invention can be applied to four-port circulators by use of a rectangular MO cylinder instead of a triangular cylinder.

Figure 7A:
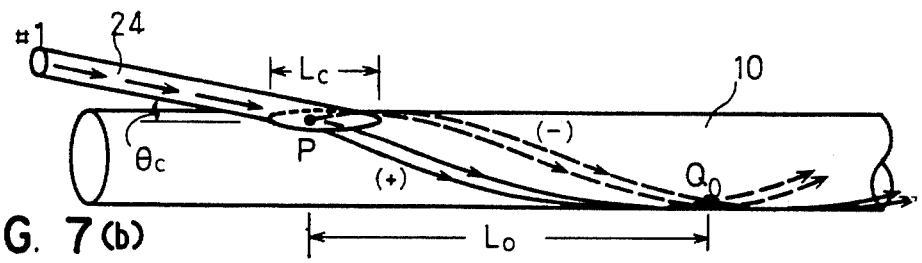
FIG. 7(a) and FIG. 7(b) show optical ray trajectories of positive and negative rotating waves, free of and under biasing magnetic field, respectively.
Figure 7B:
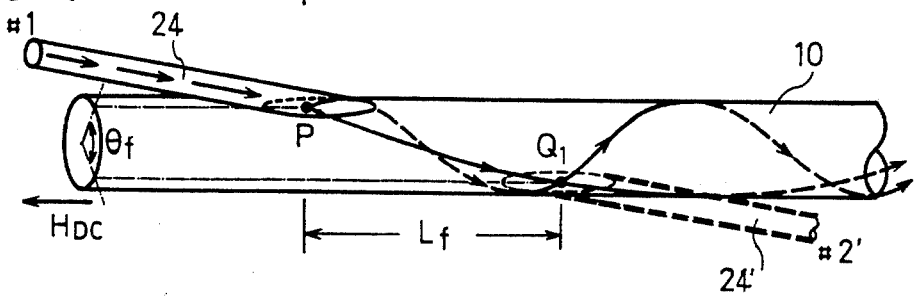

All the above-disclosed circulator embodiments of the invention are classed as a uniformly-coupled-type circulator. The other nonuniformly-coupled-type circulator embodiment of the invention will be disclosed below. Nonuniform coupling is first explained using the MOTL coupled by a single GFTL as shown in FIG. 7. The nonuniform coupling is made if the coupled GFTL 24 cut slope wise at the angle $\theta_c$ is connected to the MOTL at the opening having a short coupling distance $L_c$ which is nonetheless sufficiently longer than the wavelength of the optical wave. The incident wave power from a GFTL completely penetrates into the MOTL through this opening and excites right and left rotating waves (+) and (−). When the MOTL is free of a biasing magnetic field, the two oppositely rotating waves which the incident waves produced at the point P can meeet at the point $Q_0$ on the opposite side of the MOTL after passage through the distance $L_0$, from which no rotation of the meeting point $Q_0$ can be observed.

When the biasing magnetic field is applied, the MOTL waves are split so that the two opposite rotating waves travel down the guide along different ray trajectories as shown in FIG. 7-b and they meet at the point $Q_1$ in the direction rotated by $\theta_f$ from the opposite side to the inlet opening, after passage through the distance $L_f$ which differs from $L_0$. Consequently if a GFTL 24' is connected to the area where the meeting point $Q_1$ appears, the optical wave power can be guided from the #1 port to the #2 port through the GFTLs 24 and 24'. It is important to note that in the case of the nonuniform coupling the incident optical wave power is completely converted to the MOTL waves through the opening with the short coupling distance $L_c$, and most of the two opposite rotating wave powers concentrates in a small area around $Q_1$, where an outlet GFTL should be connected to the MOTL. The angle of rotation $\theta_f$ can be adjustable to be at 120° by change of the field $H_{DC}$.

If a reflecting mirror is located in the middle of $L_f$ between P and $Q_1$, the point $Q_1$ is turned back to the same transverse plane that includes P. According to the above given explanation, an optical wave three-port circulator is embodied as shown in FIG. 8. The MOTL junction 10 is constituted from the MOTL with one end terminated by a reflecting mirror 17, and three GFTLs 24, 24" and 24" connected nonuniformly to the MOTL at 120° apart from each other on the circumference of the MOTL, each GFTL being cut slopewise to cover its opening on the junction. The GFTLs and MOTL can be nonuniformly coupled as the degree of coupling changing in its increasing amplitude to the middle point on the opening from light coupling to tight coupling and subsequently in its decreasing amplitude beyond the middle point, since the slopewise cut end of the GFTL changes the width of the aperture. When the incident wave from the GFTL 24 enters in the junction 10, it divides into two waves (+) and (−) as shown in FIG. 8. The two waves are reflected back by the mirror 17 and meet at $Q_2$ on the opening to emanate into the GFTL 24' for the #2 port. Similarly, the wave incident on the #2 port, appears to put out from the #3 port and furthermore, the wave, incident on the #3 port, appears to put out from the #1 port. Thus, the circulation can provide a three-port circulator performance. As has been previously disclosed with the uniformly-coupled-transmission-type circulator embodiments of the invention, multiple frequency operation also can be performed with this nonuniformly-coupled circulator embodiment of the invention. As shown in FIGS. 7-b and 8, the GFTL is closely and contiguously connected to the MOTL over the distance of $L_c$. Through such coupling, the incident wave can produce coupled MOTL waves of the hybrid modes among various azimuthal mode numbers in the MOTL junction which involve multiple propagating wave modes having radially and longitudinally different wave numbers with respect to every azimuthal mode number. These coupled MOTL wave modes can present a number of operating points determined by radial and longitudinal wave numbers and an internal magnetic field locus as has been explained with FIG. 2, each operating point satisfying the meeting condition for constituent opposite rotating waves on the outlet opening of the junction. Use of multiple operating points can be made. Each operating at its operating point takes place at a different frequency. Multiple frequency operation is thus possible. If constituent operations are of forward circulations, the multiple frequency operation gives a broadband operation although the frequency band is characterized by intermittent operations of circulation. If the operating frequencies in the multiple frequency operation are chosen almost continuously, a continuous broadband operation can be obtained.

Among the multiple frequency operations, a number of the forward and reverse operations are frequently included eventually to perform a diplexer operation. By use of the diplexer operation, incident signal waves of different frequencies can be separated since in the forward and reverse operations, the signal waves put out from different ports in the forward and reverse turns, respectively, at different frequencies. Contrarily, if two signal waves of different frequencies are incident on different ports of the three-port circulator, the two signal waves can be synthesized at the remainder port to emanate.

To obtain the above-disclosed nonuniformly-coupled-type circulator that can effectively perform such multiple frequency operation, efficient coupling of the GFTLs and MOTL, excitation of desirable MOTL waves manually coupled for ideal circulation, and reconversion of the MOTL waves to the GFTL waves are necessary. To this end, the coupling structure is furnished on the openings of the MOTL junction. The MOTL junction of only a circular cylinder is now considered.

GFTLs of SI or GI type can be used for GFTLs, either of them having the diameter of as large as about 150 microns. The MOTL has a diameter a few times as large as that of the GFTL. A smaller diameter for the MOTL is required for getting better performance, and precise techniques for machining and assembling of components are necessary. Valuable ways for coupling include setting the sloping end of the GFTL to contact the opening of the junction, using the radiating element made from the same material as the core of the GFTL, and using a cylindrical microlens to irradiate lengthwise the opening of the junction. Each one is useful. The latter two are described in detail.

The microlens has a diameter larger than $0.5\phi$ and its length is of one's choice. The microlens is placed apart from the opening of the junction and used for unattached coupling of the GFTLs and the MOTL junction, so that it is adjustable to cover the opening on the junction. The optical wave radiation from the end of a GFTL is collected by the lens and is guided to irradiate the opening. The one end of the lens is cut slopewise to effectively irradiate the opening lengthwise and to efficiently excite the traveling waves of the hybrid modes inside the MOTL junction.

The simplest way of the microlens coupling is illustrated in FIG. 9-a. The sloping end of the microlens is positioned detached from the opening 25 of the junction, and the radiating waves from the sloping end irradiates the opening to excite the traveling MOTL waves. The surface of the opening is usually coated by a dielectric film to prevent scattering and reflection of incident waves and in addition, the space between the lens and the opening is optically shielded by some reflecting covering.

The opening of the junction can be formed on the flat plane 26 as shown in FIG. 9-b. The coupling efficiency is improved, since close coupling can be made.

FIG. 9-c illustrates the opening on whose surface corrugation 27 is made to strongly excite surface-volume, volume-surface, or surface-surface modes of the MOTL waves, and eventually to make the MOTL waves efficiently radiate from the opening. To shield the space around the opening, a reflecting covering is necessary. The corrugation 27 is a periodic structure made on the surface of the opening, and its periodicity usually lies in one direction perpendicular to every ridge line. If two dimensional corrugation or double corrugation which has the periodicities in two directions is applied to the opening, two different corrugations can exert the respective coupling effects efficiently to two opposite rotating waves of various surface modes. FIG. 9-d illustrates an instance of the double corrugation 28 applied to the flat opening of the junction. If close coupling can be made, better performance is achieved.

FIG. 9-e illustrates an instance of the opening 29 formed on the tapered part of the MOTL junction. This tapered MOTL squeezes the propagating wave power from the junction since the change of the diameter of the MOTL accelerates the phase velocities of the MOTL waves to let the waves radiate through the opening. FIG. 9-f illustrates an instance of another coupling by use of dielectric coupler 30 which is made of the same dielectric material as the core of the GFTL.

The nonuniformly coupled reflection type three-port circulator can perform better if the above disclosed coupling structure is applied to the openings of the junction. According to the disclosure of the three-port circulator shown in FIG. 8, a multiple-port circulator, such as a four-port circulator and a five-port circulator, can be made in a similar fashion. The four-port circulator, for example, can be set up by combining four GFTLs around the MOTL at 90° apart from each other in rotational symmetry. Thus the MOTL junction with four ports can be made. A biasing magnetic field is applied parallel to the common axis of the junction.

Another four-port circulator embodiment of the invention is shown in FIG. 10, which is of a nonuniformly-coupled-transmission-type circulator developed from the structure shown in FIG. 7-b. The circulation adjustment is made to have two opposite rotating waves of the MOTL meet at the point in the direction rotated by the angle $\theta_f = 90°$ from the inlet direction after passage through the distance $L_f$. One pair of GFTLs are coupled to the MOTL at one end and the other pair at the other end, each pair being located on a conceivable plane mutually rotated by $\theta_f = 90°$ from the other plane. The circulator performance with this four-port circulator resembles the prior-art Faraday-rotation type four-port circulator. The difference between the circulator embodiments of the invention and the prior-art circulators is ascribed to the performances of the MOTL waves of the hybrid modes and of the linearly polarized plane wave. The inlet signal wave, incident upon the #1 port through the GFTL 24, is adjusted to emanate from the #2 port through the GFTL 24' after passage through the distance $L_f$. Then if the wave is incident upon the #2 port, the output wave emanates from the #4 port. The waves incident upon the #4 and the #3 ports, respectively are to emanate from the #3 and the #1 ports. Thus the four-port circulation takes place. If various operating points corresponding to so many operating modes of the MOTL waves coupled are used, multiple frequency operations can be also obtained, and there-by, broadband operation can be obtained.

Finally, application of the above-disclosed optical wave circulator embodiment of the invention to millimeter wave circulators is explained. In the millimeter wave region, a rectangular waveguide is furnished to the waveguiding system for coupling signal waves with the waves of the hybrid modes propagating in the ferromagnetic circular cylinder, with the biasing magnetic field applied parallel to the common axis. The propagating waves in the rectangular waveguide are of TE modes, as far as the dominant mode is concerned and consequently the rectangular waveguide acts as a linearly polarizing element. The way of coupling by use of the rectangular waveguide is inconvenient to take advantage of such an inter-hybrid modal coupling as has been disclosed in the optical wave circulator embodiment of the invention.

To retain the inter-hybrid modal coupling, the waveguiding system must be enabled to supplement the imperfection of the TE mode. To this end, a coupling rectangular waveguide having a square cross section is partially loaded with dielectric. FIG. 11 illustrates an elevation in section of a circulator embodiment of the invention that is applied to the millimeter wave type. A coupling waveguide 32 is embedded in a brass piece 35 constituting a casing, which is set up with three pieces by screwbolts 36. A dielectric 33 is inserted in each waveguide, attached to the ferromagnetic circular cylinder 31 to feed millimeter wave power. If this ferromagnetic three-port junction is constructed to form a uniform coupling structure on the opening, circulators of transmission and reflection types can be realized, and in addition, nonuniformly-coupled circulators for transmission and reflection types are also possible by using a nonuniform coupling structure. With these circulator embodiments of the invention, multiple frequency operation is performed. However, operating modes of coupled hybrid modes are constituted from the hybrid modes determined by the magnetic wall condition on the circumferential surface of the ferromagnetic cylinder. To improve higher mode operations in the multiple frequency operation, a dielectric sheet or conductive film, 34 is placed lengthwise on each counterposition to three coupled waveguides 32 and 33 connected to the ferromagnetic cylinder 31. The propagating waves are influenced with these elements, particularly concerning the wave modes having the electric field maxima on these counter positions, since the attachment of these elements causes the change of the boundary condition on the circumferential surface of the ferromagnetic cylinder. The width W, thickness T, and length L of the elements 34 are important parameters to be adjustable through circulator adjustments. A longitudinal view taken on the common axis is not shown, but the longitudinal configuration of the setup of the circulator may be imagined from the above-disclosed illustrations shown in FIGS. 1 to 10. Use of ferromagnetic triangular cylinders or truncated triangular cylinders is possible to get better performance of the circulator embodiments of the invention.

What we claim is:

1. A traveling wave coupled circulator comprising a magneto-optic circular-cylindrical-transmission-line structure made of magneto-optic material having optical anisotropy under biasing magnetic field to act magneto-optic Faraday rotation, said magneto-optic structure being arranged on the common axis, and said magneto-optic structure being optically shielded, plural numbers of optical waveguiding couplers, each coupler being positioned against an opening formed on a given area on said magneto-optic structure in rotational symmetry around said common axis, and means for magnetically biasing said magneto-optic structure in the direction parallel to said common axis.

2. A traveling wave coupled circulator as defined in claim 1, wherein a given coupling structure is formed over said area on said opening on said magneto-optic structure.

3. A traveling wave coupled circulator as defined in claim 1, wherein said magneto-optic structure is terminated with a reflecting mirror positioned perpendicularly to said common axis.

4. A traveling wave coupled circulator as defined in claim 1, wherein said magneto-optic structure is constructed with a magneto-optic triangular cylinder.

5. A traveling wave coupled circulator as defined in claim 1, wherein said magneto-optic structure is constructed with a magneto-optic truncated triangular cylinder.

6. A traveling wave coupled circulator as defined in claim 1, wherein said magneto-optic structure is terminated with tapering on which said opening is formed.

7. A traveling wave coupled circulator as defined in claim 1, wherein said magneto-optic structure is attached with dielectric sheets, each sheet being positioned on a given area formed on an opening made at counterpositions to said optical waveguiding couplers.

8. A traveling wave coupled circulator comprising a magneto-optic circular-cylindrical-transmission-line structure having optical anisotropy under biasing magnetic field to act magneto-optic Faraday rotation, said magneto-optic structure being arranged on the common axis, and said magneto-optic structure being optically shielded, two sets of plural numbers of optical waveguiding couplers, each coupler of said two sets being positioned against an opening formed on a given area on said magneto-optic structure in rotational symmetry based on said two sets of plural numbers around said common axis, and one set being positioned in a given distance apart from the other set in the direction along said common axis, and means for magnetically biasing said magneto-optic structure in the direction parallel to said common axis.

9. A traveling wave coupled circulator as defined in claim 8, wherein a given coupling structure is formed over said area on said opening on said magneto-optic structure.

10. A traveling wave coupled circulator as defined in claim 8, wherein said magneto-optic structure is terminated with a reflecting mirror positioned perpendicularly to said common axis.

11. A traveling wave coupled circulator as defined in claim 8, wherein said magneto-optic structure is constructed with a magneto-optic triangular cylinder.

12. A traveling wave coupled circulator as defined in claim 8, wherein said magneto-optic structure is constructed with a magneto-optic truncated triangular cylinder.

13. A traveling wave coupled circulator as defined in claim 8, wherein said magneto-optic structure is terminated with tapering on which said opening is formed.

14. A traveling wave coupled circulator as defined in claim 8, wherein said magneto-optic structure is attached with dielectric sheets, each sheet being positioned on a given area formed on an opening made at counterpositions to said optical waveguiding couplers.

15. A traveling wave coupled circulator comprising a ferromagnetic circular-cylindrical-transmission-line structure made of ferromagnetic material having ferromagnetic anisotropy under biasing magnetic field to act ferromagnetic Faraday rotation, and said ferromagnetic structure being arranged on the common axis, plural numbers of waveguiding couplers, each coupler being positioned on said ferromagnetic structure in rotational symmetry around said common axis, and means for magnetically biasing said ferromagnetic structure in the direction parallel to said common axis.

16. A traveling wave coupled circulator comprising a ferromagnetic circular-cylindrical-transmission-line structure made of ferromagnetic material having ferromagnetic anisotropy under biasing magnetic field to act ferromagnetic Faraday rotation, and said ferromagnetic structure being arranged on the common axis, two sets of plural numbers of waveguiding couplers, each coupler of said two sets being positioned on said ferromagnetic structure in rotational symmetry based on said two sets of plural numbers around said common axis, and one set being positioned in a given distance apart from the other set in the direction along said common axis, and means for magnetically biasing said ferromagnetic structure in the direction parallel to said common axis.

* * * * *